(12) United States Patent
Furukawa

(10) Patent No.: US 7,046,574 B2
(45) Date of Patent: May 16, 2006

(54) MEMORY SYSTEM

(75) Inventor: Hideyuki Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 10/207,079

(22) Filed: Jul. 30, 2002

(65) Prior Publication Data

US 2003/0101313 A1 May 29, 2003

(30) Foreign Application Priority Data

Nov. 27, 2001 (JP) .................................. 2001-361238

(51) Int. Cl.
*G11C 7/00* (2006.01)

(52) U.S. Cl. .................... 365/230.01; 365/230.03; 365/185.11; 711/103; 711/202; 711/203; 711/209; 711/221

(58) Field of Classification Search ............ 365/230.01, 365/230.03, 185.11; 711/202, 203, 209, 221, 711/103
See application file for complete search history.

(56) References Cited

U.S. PATENT DOCUMENTS

| | | | | | |
|---|---|---|---|---|---|
| 3,891,974 | A | * | 6/1975 | Coulter et al. ................ 703/23 |
| 3,914,747 | A | * | 10/1975 | Barnes et al. ................ 711/206 |
| 4,318,182 | A | * | 3/1982 | Bachman et al. ........... 718/105 |
| 4,369,494 | A | * | 1/1983 | Bienvenu et al. ........... 713/400 |
| 5,644,699 | A | * | 7/1997 | Yoshida ......................... 714/7 |
| 5,754,817 | A | | 5/1998 | Wells et al. |
| 5,822,787 | A | * | 10/1998 | Zucker ....................... 711/213 |
| 5,835,743 | A | * | 11/1998 | Zucker ....................... 712/200 |
| 5,960,212 | A | * | 9/1999 | Mak ............................ 712/34 |
| 5,991,902 | A | * | 11/1999 | Yoshida ...................... 714/710 |
| 6,000,006 | A | * | 12/1999 | Bruce et al. ................ 711/103 |
| 6,223,275 | B1 | * | 4/2001 | Goto et al. ................. 712/200 |
| 6,292,874 | B1 | | 9/2001 | Barnett |
| 6,377,500 | B1 | * | 4/2002 | Fujimoto et al. ...... 365/230.01 |
| 6,430,650 | B1 | * | 8/2002 | Miyauchi .................... 711/103 |
| 2001/0048121 | A1 | * | 12/2001 | Mizushima et al. ........ 257/200 |
| 2002/0069314 | A1 | * | 6/2002 | Miyauchi .................... 711/103 |

FOREIGN PATENT DOCUMENTS

EP 1 134 662 A1 9/2001

OTHER PUBLICATIONS

US 6,781,913, 8/2004, Furukawa (withdrawn)*
European Search Report; Dated: Jun. 24, 2004.

* cited by examiner

*Primary Examiner*—Viet Q. Nguyen
(74) *Attorney, Agent, or Firm*—Staas & Halsey LLP

(57) ABSTRACT

A memory system having a semiconductor storage device divided into plural areas, in which information becomes accessible by specifying an absolute physical address, and a control section for controlling the semiconductor storage device is provided. The control section receives a designating signal for designating one area out of the plural areas of the semiconductor storage device and a relative physical address independent by each area and specifies the absolute physical address by adding an offset address corresponding to the area designated by the designating signal to the relative physical address so that the semiconductor storage device is accessed.

9 Claims, 7 Drawing Sheets

F I G. 1

| PHYSICAL BLOCK ADDRESS | INFORMATION STORED IN SPECIFIC AREA OF EACH BLOCK | | EXPLANATION |
|---|---|---|---|
| | LOGICAL ADDRESS | AVAILABILITY | |
| 0 (0) | NOT GIVEN | AVAILABLE | PHYSICAL FORMAT STRUCTURE INFORMATION |
| 1 (1) | 0 | AVAILABLE | LOGICAL FORMAT STRUCTURE INFORMATION |
| 2 (2) | 1 | AVAILABLE | FAT INFORMATION |
| 3 (3) | 4 | AVAILABLE | DATA AREA |
| 4 (4) | 5 | AVAILABLE | DITTO |
| 5 (5) | NOT GIVEN | UNAVAILABLE | DEFECT BLOCK |
| 6 (6) | 6 | AVAILABLE | DATA AREA |
| 7 (7) | 2 | AVAILABLE | DITTO |
| 8 (8) | 3 | AVAILABLE | DITTO |
| 9 (9) | NOT GIVEN | AVAILABLE | RESERVED AREA |
| 10 (0) | NOT GIVEN | AVAILABLE | PHYSICAL FORMAT STRUCTURE INFORMATION |
| 11 (1) | 0 | AVAILABLE | LOGICAL FORMAT STRUCTURE INFORMATION |
| 12 (2) | 1 | AVAILABLE | FAT INFORMATION |
| 13 (3) | 2 | AVAILABLE | DATA AREA |
| 14 (4) | 3 | AVAILABLE | DITTO |
| 15 (5) | 4 | AVAILABLE | DITTO |
| 16 (6) | 5 | AVAILABLE | DITTO |
| 17 (7) | 6 | AVAILABLE | DITTO |
| 18 (8) | NOT GIVEN | AVAILABLE | RESERVED AREA |
| 19 (9) | NOT GIVEN | AVAILABLE | DITTO |

101    102    103    104

A1 (blocks 0–9), A2 (blocks 10–19)

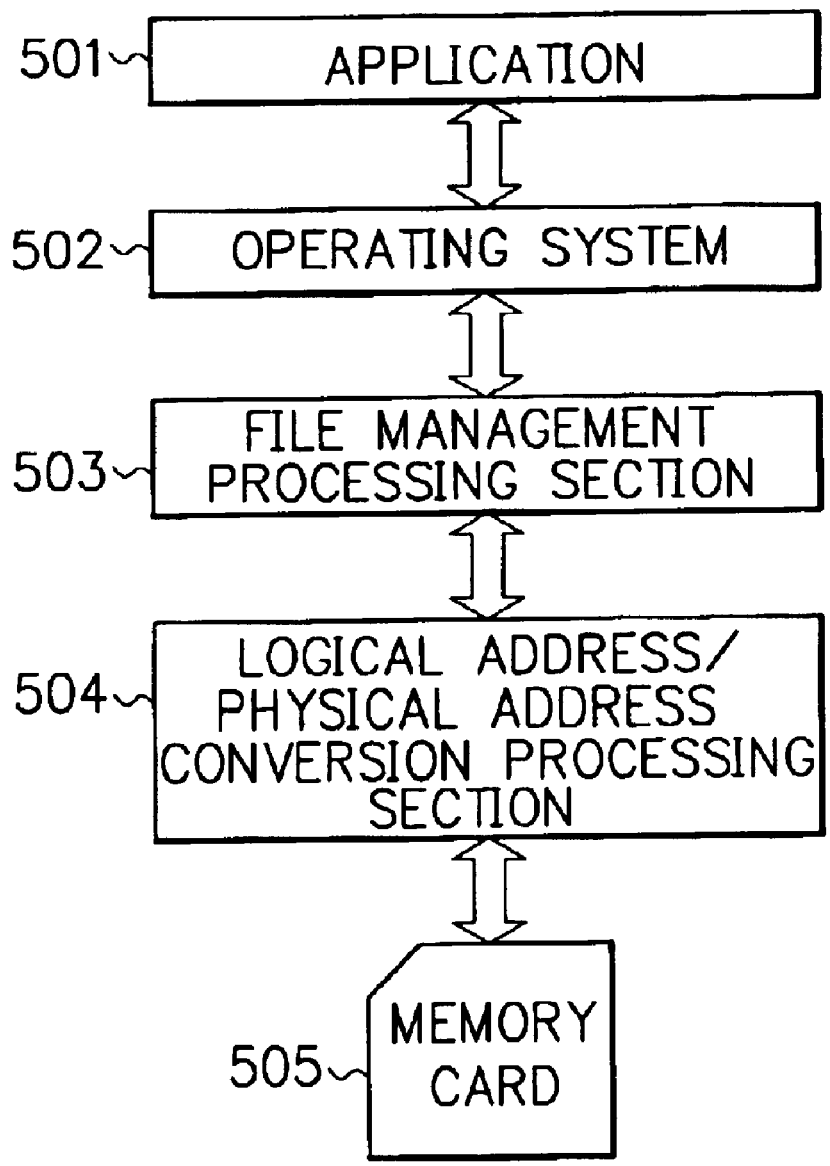

FIG. 6
PRIOR ART

| PHYSICAL BLOCK ADDRESS | INFORMATION STORED IN SPECIFIC AREA OF EACH BLOCK | | EXPLANATION |
|---|---|---|---|
| | LOGICAL ADDRESS | AVAILABILITY | |
| 0 | NOT GIVEN | AVAILABLE | PHYSICAL FORMAT STRUCTURE INFORMATION |
| 1 | 6 | AVAILABLE | DATA AREA |
| 2 | 0 | AVAILABLE | LOGICAL FORMAT STRUCTURE INFORMATION |
| 3 | 1 | AVAILABLE | FAT INFORMATION |
| 4 | 3 | AVAILABLE | DATA AREA |
| 5 | NOT GIVEN | UNAVAILABLE | DEFECT BLOCK |
| 6 | 5 | AVAILABLE | DATA AREA |
| 7 | 4 | AVAILABLE | DITTO |
| 8 | 2 | AVAILABLE | DITTO |
| 9 | 7 | AVAILABLE | DITTO <BLOCK 1 HOLDING FILE A> |
| 10 | 8 | AVAILABLE | DITTO <BLOCK 2 HOLDING FILE A> |
| 11 | 10 | AVAILABLE | DITTO |
| 12 | 12 | AVAILABLE | DITTO |
| 13 | 9 | AVAILABLE | DITTO |
| 14 | 11 | AVAILABLE | DITTO <BLOCK 3 HOLDING FILE A> |
| 15 | 14 | AVAILABLE | DITTO |
| 16 | 15 | AVAILABLE | DITTO |
| 17 | 13 | AVAILABLE | DITTO |
| 18 | NOT GIVEN | AVAILABLE | RESERVED AREA |
| 19 | NOT GIVEN | AVAILABLE | DITTO |
| 601 | 602 | 603 | 604 |

MEMORY SYSTEM

CROSS-REFERENCE TO RELATED APPLICATIONS

This application is based upon and claims priority of Japanese Patent Application No. 2001-361238, filed on Nov. 27, 2001, the contents being incorporated herein by reference.

BACKGROUND OF THE INVENTION

1. Field of the Invention

The present invention relates to a memory system.

2. Description of the Related Art

FIG. 7 is a block diagram showing the structure of a prior memory card and its explanation will be given below.

A memory card 701 is composed of a control section 702 and a semiconductor storage device section 703. An input/output line 708 is a line for inputting/outputting a control signal and data. The control section 702 includes a command control unit 705, an address control unit 706, a buffer control unit 707, and a data buffer 704. The command control unit 705 can select and execute processing in accordance with a command inputted from the outside. The address control unit 706 can set an address included in the command, which is transferred from the command control unit 705, in the semiconductor storage device section 703. The data buffer 704 temporarily stores input/output data. The buffer control unit 707 can control the data buffer 704. The control section 702 can control other functions than the address setting of the semiconductor storage device section 703.

A host of the outside can control the memory card 701. When the host desires to access a physical address n of the semiconductor storage device section 703, it inputs the physical address n together with a predetermined command into the input/output line 708 of the memory card 701. In the control section 702, an address is set by the command control unit 705 and address control unit 706 so that the semiconductor storage device section 703 becomes accessible.

In a prior memory card having a nonvolatile semiconductor storage device typified by a NAND-type flash memory installed therein, a defect area exists as in a hard disc drive or the like, and management of an address and logical address/physical address conversion processing of the defect area are performed. An example of the address management will be explained with reference to FIG. 5 and FIG. 6.

FIG. 5 shows the layer structure of the address management of the prior memory card. An operating system 502 can access a memory card 505 as required in accordance with a code of an application 501. In this case, the operating system 502 transfers a name of a file desired to be accessed, directory information, and the like to a file management processing section 503. In accordance with the transferred data, the file management processing section 503 transfers information on a logical address to be accessed to a logical address/physical address conversion processing section 504. The logical address/physical address conversion processing section 504 retrieves the designated logical address from the memory card 505 and converts it to a corresponding physical address so as to access the memory card 505.

FIG. 6 shows an example of file management of the prior memory card. The memory card stores a logical address 602 and availability information 603 by each physical block address 601. Specifically, the logical address 602 and availability information 603 are stored in a specific area of each block. An explanation 604 is an explanation about each block.

An example of data format of the memory card will be explained. The memory card is erasable by each block unit and, to simplify the explanation, the total number of the blocks is supposed as 20. The memory is supposed to have a defect in a block of a physical address "5". Further, FIG. 6 shows a state in which the correspondence between the physical addresses and logical addresses has become unsystematic as a result of repeated data rewrite and the like. It is supposed that the memory card has physical format structure information in the head address "0" of the physical addresses 601 and logical format structure information in the head address "0" of the logical addresses 602, that is, a physical address "2" in FIG. 6, in accordance with the physical format structure information. It should be noted that the physical address is an address on the semiconductor storage device and the logical address is a virtual address set by the file management processing section 503 (FIG. 5).

In general, for each file recorded in the memory card, there exists data showing the logical address of a destination where data of the file is held. For example, in an MS-DOS compatible format, the data is called FAT (File Allocation Table) and, in the example in FIG. 6, the FAT information exists in a logical address "1".

At this time, the logical address of the file is operated by the file management processing section 503. The physical address is operated by the logical address/physical address conversion processing section 504 and, for example, as shown by a file A which occupies three blocks, stored physical addresses are not systematic and may possibly be allocated anywhere across the whole data areas.

Plural applications are stored in one memory card in some cases. The host can select and access the applications in the memory card. In such a case, it is sometimes desired to protect data made by one application while other applications are being accessed. In this case, as a method for securely protecting it, there can be considered a method in which a memory space of the memory card is divided so that applications use separated memory spaces respectively.

However, in the prior memory card, it is difficult to divide the memory space and therefore it is impossible to manage security by this method.

SUMMARY OF THE INVENTION

It is an object of the present invention to divide a memory space to facilitate security management.

According to one aspect of the present invention, provided is a memory system comprising a semiconductor storage device divided into plural areas, in which information becomes accessible by specifying an absolute physical address, and a control section for controlling the semiconductor storage device. The control section receives a designating signal for designating one area out of the plural areas of the semiconductor storage device and a relative physical address independent by each area, and specifies the absolute physical address by adding an offset address corresponding to the area designated by the designating signal to the relative physical address, so that the semiconductor storage device is accessed.

Since the semiconductor storage device is divided into the plural areas and the control section receives the relative physical address independent by each area, a user can handle the respective areas as if they were memories separated from each other. By the area designation, only the designated area becomes accessible so that the security management can be easily and securely performed.

BRIEF DESCRIPTION OF THE DRAWINGS

FIG. 1 is a table showing an example of file data management of a memory system according to an embodiment of the present invention;

FIG. 5 is a diagram showing the layer structure of address management of a memory card in a prior art;

FIG. 6 is a table showing file management of the memory card in the prior art.

DETAILED DESCRIPTION OF THE PREFERRED EMBODIMENTS

Figure 2:
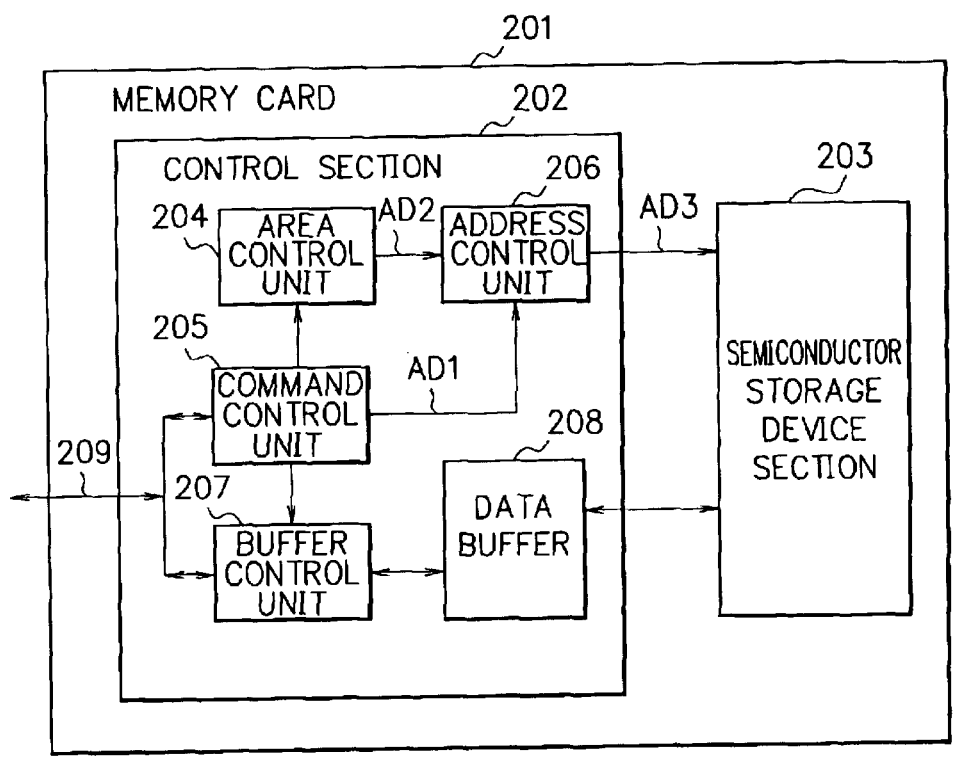
FIG. 2 is a block diagram showing the structure of a memory card of the embodiment.

FIG. 1 shows an example of file data management of a memory system (example of formatting a memory card) according to an embodiment of the present invention. To simplify an explanation, this embodiment will be explained corresponding to FIG. 6. It should be noted that the number of blocks, the physical format structure, and the logical format structure are not limited to those in this explanation.

A memory card stores a logical address 102 and availability information 103 for each physical block address 101. Specifically, the logical address 102 and availability information 103 are stored in a specific area of each block. An explanation 104 is an explanation about each block. The physical block address 101 indicates an absolute physical address and the number inside parentheses indicates a relative physical address.

In this embodiment, the memory card is erasable by each block unit. A memory area is divided into plural areas A1 and A2, each of which is composed of plural blocks, and the logical addresses 102 are respectively set as the logical addresses 102 independent by each of the divided areas A1 and A2. In the example in FIG. 1, the whole area of 20 blocks is divided into the equal two areas A1 and A2. The first area A1 including absolute physical addresses "0" to "9" has physical format structure information in the absolute physical address "0". The second area A2 including absolute physical addresses "10" to "19" has physical format structure information in the absolute physical address "10". Each of the physical format structure information is information regarding each of the divided areas A1 and A2 as a whole area and logical format structure information including logical address setting is also set independently by each area.

In this example, not only the logical addresses 102 but also the physical format structure information and the logical format structure information are independently set by each area, but the present invention is not limited to the format which is wholly independent as described above. It is possible to set only one piece of the physical format structure information common to the areas while setting the logical format structure information by each area. FAT information is also set by each of the areas A1 and A2. In addition, the memory card includes a defect block in some cases and manages an address of the defect block.

The memory card stores the logical address 102 corresponding to the absolute physical address 101 of each block. Each of the areas A1 and A2 of the memory card is composed of a group of the plural blocks whose absolute physical addresses are consecutive. The logical addresses 102 are the logical addresses independent by each of the areas A1 and A2.

FIG. 2 shows an example of the inner structure of the memory card according to the embodiment.

A memory card 201 is composed of a control section 202 and a semiconductor storage device section 203. An input/output line 209 is a line for inputting/outputting a control signal and data. The control section 202 includes a command control unit 205, an area control unit 204, an address control unit 206, a buffer control unit 207, and a data buffer 208. The command control unit 205 can select and execute processing in accordance with a command inputted from the outside. The address control unit 206 can set an address AD3 in the semiconductor storage device section 203 in accordance with an address AD1 included in the command, which is transferred from the command control unit 205, and an address AD2 which is transferred from the area control unit 204. The data buffer 208 temporarily stores input/output data. The buffer control unit 207 can control the data buffer 208. The control section 202 controls other functions than the address setting of the semiconductor storage device section 203. A host controlling the memory card inputs a relative physical address together with a predetermined command when it desires to access the semiconductor storage device section 203. In the control section 202, an address is set by the command control unit 205, area control unit 204, and address control unit 206 so that the semiconductor storage device section 203 becomes accessible.

Information in the semiconductor storage device section 203 becomes accessible by specifying the absolute physical address and the semiconductor storage device section 203 is erasable by each block unit composed of plural nonvolatile memory cells.

The host designates an area by an area designating command. The command control unit 205 receives the area designating command and updates area designation of the area control unit 204. The area control unit 204 outputs the offset address AD2 corresponding to the designated area to the address control unit 206. The offset address AD2 is the head absolute physical address of each of the areas A1 and A2. In FIG. 1, the offset address AD2 of the area A1 is 0 and the offset address AD2-of the area A2 is 10.

The host inputs the relative physical address together with the command into the memory card. The command is write, read, erase, or the like. The command control unit 205 outputs the relative physical address AD1 to the address control unit 206. The relative physical addresses AD1 are the addresses shown inside the parentheses of the physical addresses 101 in FIG. 1 and the physical addresses independent by each area when the head physical address of each of the areas A1 and A2 is regarded as 0.

The address control unit 206 adds the relative physical address AD1 to the offset address AD2 and outputs the sum to the semiconductor storage device section 203 as the absolute physical address AD3. The absolute physical address AD3 corresponds to the physical address 101 in FIG. 1, which is the address inputted to the semiconductor storage device section 203 when the semiconductor storage device section 203 is accessed.

When one area of the plural areas is designated by the area designating command, the control section 202 becomes able to access only the designated area. With such a function, the host can use the designated area as one virtual memory card without paying attention to other areas after issuing the area designating command. In other words, the host can use the memory card as if the areas were memory cards separated from each other.

Figure 3:
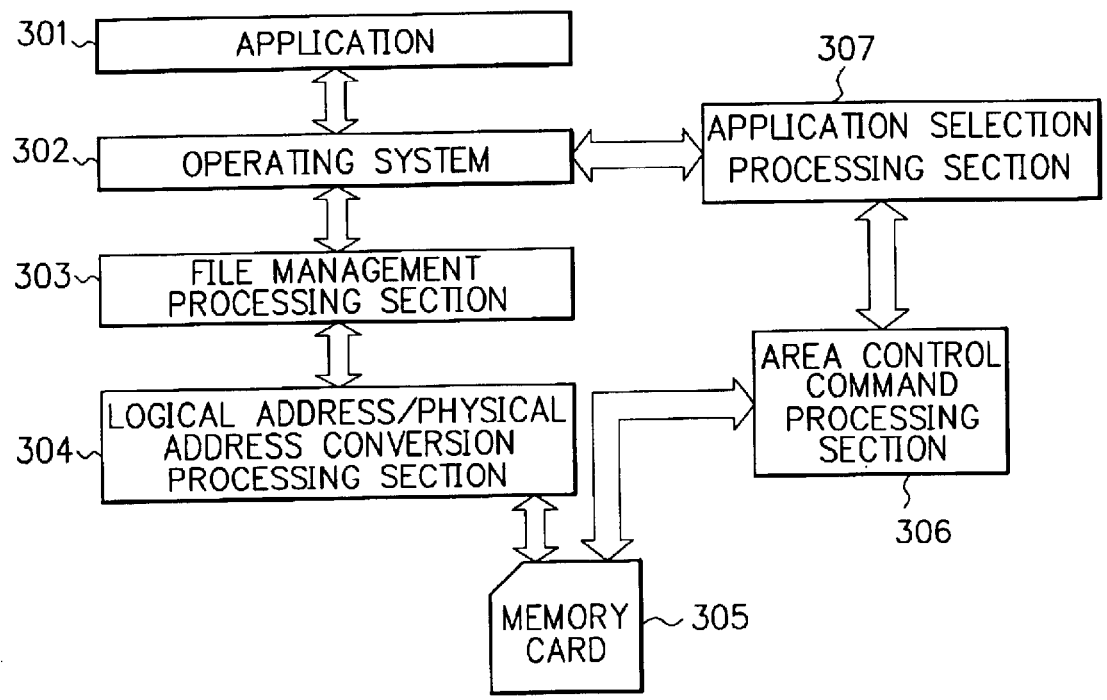
FIG. 3 is a diagram showing the layer structure of address management of the memory system of the embodiment.

FIG. 3 shows an example of the layer structure of address management of the memory system according to the embodiment. A user can select one application out of plural applications by operating an operation element. An application selection processing section 307 receives a request in accordance with the operation of the user and selects a target application. An operating system 302 executes a selected application 301. Data handled by the application 301 can be written into and read from a memory card 305.

A method for accessing the memory card 305 will be explained. The operating system 302 transfers a name of a file desired to be accessed, directory information, and the like to a file management processing section 303. In accordance with the transferred data, the file management processing section 303 transfers a logical address to be accessed to a logical address/physical address conversion processing section 304. The logical address/physical address conversion processing section 304 retrieves the designated logical address from the memory card 305, converts it to a corresponding relative physical address, and outputs it to the memory card 305.

At this time, the application selection processing section 307 notifies an area control command processing section 306 of the selected application. In the memory card 305, the correlation between the applications and the areas is stored. The area control command processing section 306 issues an area designating command to the memory card 305 in accordance with the above-described correlation, so as to designate an area which the application under execution is permitted to access. This produces the same effect as in a case where applications use separated memory cards respectively, and this can be realized without inserting/pulling out the memory card.

Accordingly, security can be easily ensured by separating application data between the plural applications.

Figure 4:
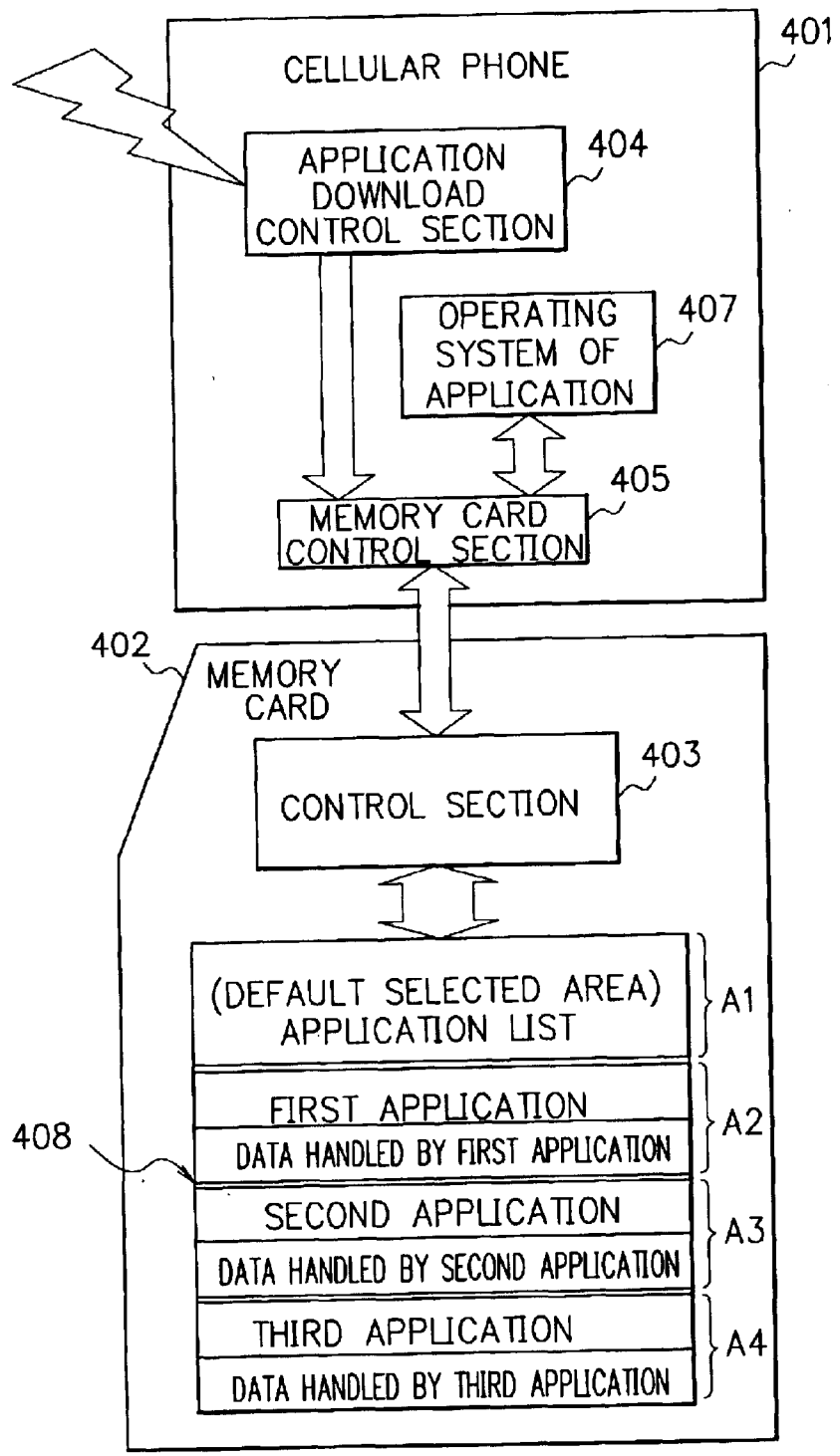
FIG. 4 is a diagram showing the structure of the memory system (cellular phone) of the embodiment.
Figure 7:
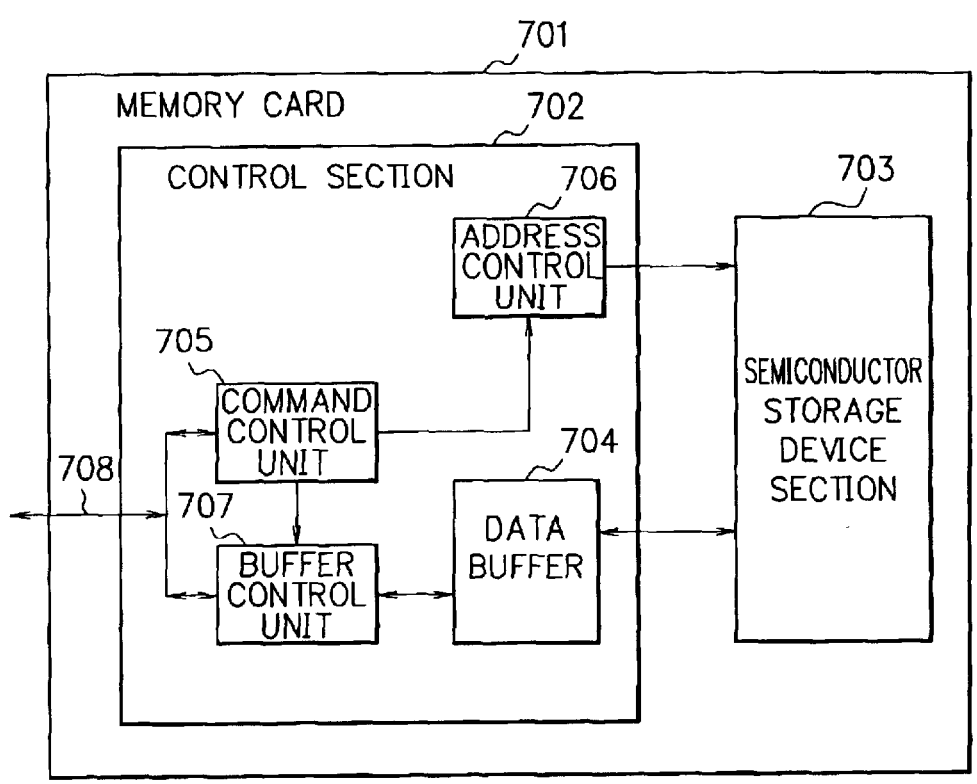
FIG. 7 is a block diagram showing the structure of the memory card in the prior art.

FIG. 4 shows an example of the memory system. The memory system includes a cellular phone 401 and a memory card 402 to be inserted therein, and is capable of downloading and executing an application. The cellular phone 401 includes an application download control section 404, an operating system (OS) 407 of the application, and a memory card control section 405. The memory card 402 includes a control section 403 and a semiconductor storage device section 408. The control section 403 corresponds to the control section 202 in FIG. 2. The semiconductor storage device section 408 corresponds to the semiconductor storage device section 203 in FIG. 2, and is, for example, a NAND-type flash memory having four areas A1 to A4. The memory card control section 405 corresponds to the file management processing section 303, logical address/physical address conversion processing section 304, area control command processing section 306, and application selection processing section 307 in FIG. 3.

A second area A2 is an area for storing a first application and data handled by the first application, a third area A3 is an area for storing a second application and data handled by the second application, and a fourth area A4 is an area for storing a third application and data handled by the third application.

A first area A1 is a default selected area where an application list is stored. The application list is a list showing the correlation between the areas A2 and A4 and the applications stored therein.

This memory system can download an application into the memory card 402 by radio wave communication and has a function of executing the downloaded application.

The application is downloaded in the following steps. First, when the user performs a download operation with an operation button of the cellular phone 401, the application download control section 404 can download the application into the memory card 402 by radio wave communication. Specifically, the memory card control section 405 determines an appropriate area to be a download destination in the semiconductor storage device section 408, and issues an area designating command to the memory card 402. At this time, the appropriate area is designated with reference to the application list stored in the first area A1. For example, the area designating command is issued so that the second area A2 is selected. The application download control section 404 starts downloading and the control section 403 records the application in, for example, the second area A2. The control section 403 corresponds to the control section 202 in FIG. 2. At this time, the memory card control section 405 creates or updates list data of all applications, which are stored in the memory card 402, in the default selected area A1 via the control section 403.

The application is executed in the following steps. First, the application list is read from the first area A1 and the user operates to select an application to start. For example, when the first application is selected, the memory card control section 405 issues an area designating command for designating the second area A2 to the memory card 402, reads the first application from the second area A2, and executes it.

As described above, the areas A2 to A4 are the areas each of which becomes accessible when it is designated by the area designating command. The default selected area A1 is the area which becomes accessible when none of the areas is designated by the area designating command. When one area out of the plural areas A2 to A4 is designated by the area designating command, the control section 403 becomes able to access only the designated area, while when none of the areas is designated by the area designating command, the control section 403 becomes able to access only the default selected area A1.

The application can be instructed to write, read, and erase the data file in the memory card, and the memory card control section 405 is supposed not to issue a command for designating an area at all during the execution of the application. As a result, the application can write, read, or erase the data only in the same area as an area where its own program code is stored.

By the aforesaid method, for example, an application which handles information such as personal data and other applications can be surely separated, so that, even if a malicious application exists, risks such as alteration of important personal data or stealing of them can be surely prevented.

According to this embodiment, the semiconductor storage device section 408 is divided into the plural areas A1 to A4 and the control section 403 receives the relative physical address independent by each area from the cellular phone 401 so that the user can handle the respective areas as if they were the memory cards separated from each other. By the area designation, only the designated area becomes accessible, which enables the security management to be performed easily and surely.

Incidentally, the present embodiment is to be considered in all respects as illustrative and no restrictive, and all changes which come with in the meaning and range of equivalency of the claims are therefore intended to be embraced therein. The invention may be embodied in other specific forms without departing from the spirit or essential characteristics thereof.

As explained above, the semiconductor storage device is divided into the plural areas and the control section receives the relative physical address independent by each area so that the user can handle the respective areas as if they were memories separated from each other. By the area designation, only the designated area becomes accessible, which enables the security management to be performed easily and surely.

What is claimed is:

1. A memory system comprising:

a semiconductor storage device divided into plural areas, in which information becomes accessible by specifying an absolute physical address, and a control section for receiving a designating signal for designating one area out of the plural areas of said semiconductor storage device and a relative physical address independent of each of the areas, and specifying the absolute physical address by adding an offset address corresponding to the area designated by the designating signal to the relative physical address, so that said semiconductor storage device is accessed, wherein, when one area out of the plural areas is designated by the designating signal, said control section becomes able to access only the designated area, wherein said semiconductor storage device includes first plural areas each of which becomes accessible when it is designated by the designating signal and a second area which becomes accessible when none of the areas is designated by the designating signal, and wherein, when one area out of the first plural areas is designated by the designating signal, said control section becomes able to access only the designated area, and when none of the areas is designated by the designating signal, said control section becomes able to access only the second area.

2. The memory system according to claim 1, wherein said semiconductor storage device is erasable by each block unit comprising plural nonvolatile memory cells.

3. The memory system according to claim 2, wherein said semiconductor storage device is a flash memory.

4. The memory system according to claim 2, wherein said semiconductor storage device stores a logical address corresponding to the absolute physical address of each block, each of the areas of said semiconductor storage device comprises a group of plural blocks whose absolute physical addresses are consecutive, and the logical address is a logical address independent by each of the areas.

5. The memory system according to claim 1, further comprising:

an application selection processing section for selecting an application, wherein applications are stored in the first plural areas respectively, and an application list showing the correlation between the first plural areas and the applications is stored in the second area, and wherein said control section receives the designating signal and designates an area in which the selected application is stored in accordance with the application list and becomes able to access only the designated area.

6. The memory system according to claim 5, wherein the applications and data handled by the applications are stored in the first plural areas respectively.

7. The memory system according to claim 6, further comprising:

a download section for downloading the application from the outside and recording the downloaded application in the first area.

8. The memory system according to claim 1, further comprising:

a conversion processing section for converting a logical address to the relative physical address in accordance with the logical address stored in said semiconductor storage device, and outputting the relative physical address to said control section.

9. A memory system comprising:

a semiconductor storage device divided into plural areas, in which information becomes accessible by specifying an absolute physical address, and a control section for receiving a designating signal for designating one area out of the plural areas of said semiconductor storage device and a relative physical address independent of each of the areas, and specifying the absolute physical address by adding an offset address corresponding to the area designated by the designating signal to the relative physical address, so that said semiconductor storage device is accessed, wherein said semiconductor storage device includes first plural areas each of which becomes accessible by the control section when designated by the designating signal and a second area which becomes accessible by the control section when none of the first plural areas is designated by the designating signal.

* * * * *